No. 740,528. PATENTED OCT. 6, 1903.
H. B. CARY.
FURNACE.
APPLICATION FILED JAN. 12, 1900.
NO MODEL. 2 SHEETS—SHEET 2.
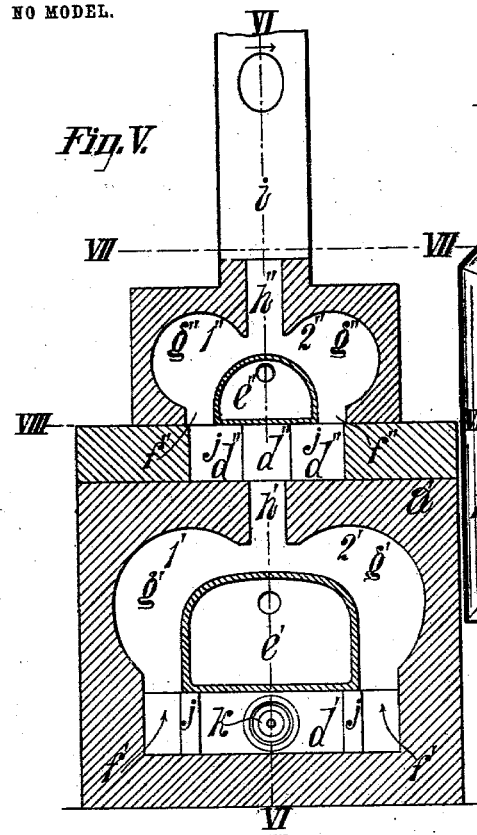
Fig. V.
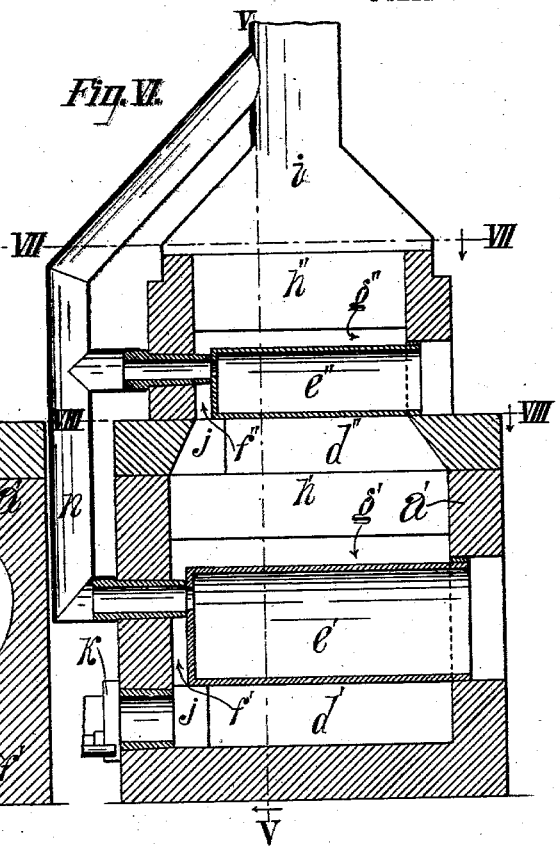
Fig. VI.
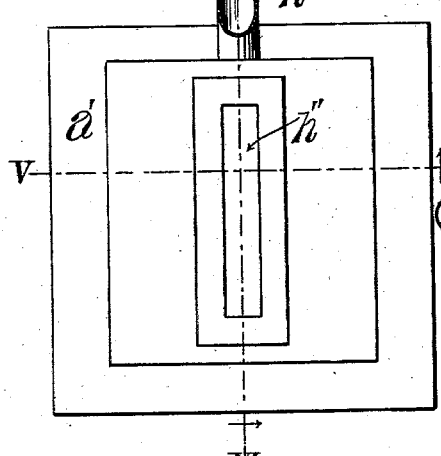
Fig. VII.
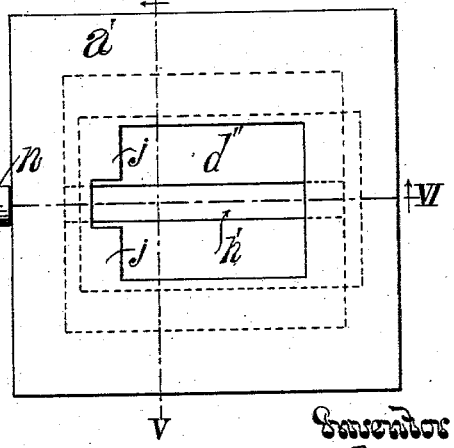
Fig. VIII.
Witnesses
Henry Kingman
F. Townsend.
Inventor
Henry Bounds Cary
by Townsend Bro.
his attys.

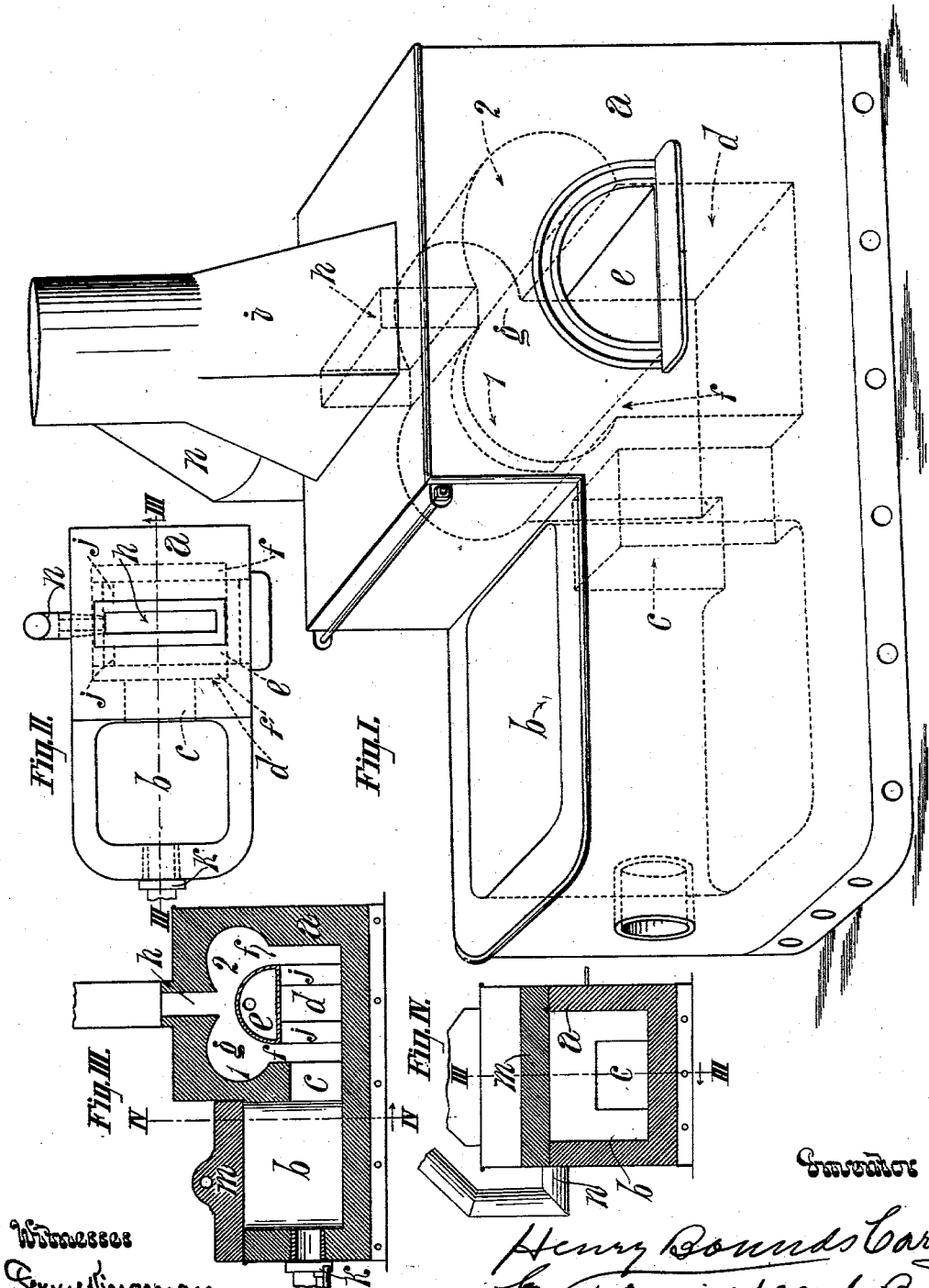

No. 740,528. Patented October 6, 1903.

UNITED STATES PATENT OFFICE.

HENRY BOUNDS CARY, OF LOS ANGELES, CALIFORNIA, ASSIGNOR TO FREDERICK W. BRAUN, OF LOS ANGELES, CALIFORNIA.

FURNACE.

SPECIFICATION forming part of Letters Patent No. 740,528, dated October 6, 1903.

Application filed January 12, 1900. Serial No. 1,208. (No model.)

*To all whom it may concern:*

Be it known that I, HENRY BOUNDS CARY, a citizen of the United States, residing at Los Angeles, in the county of Los Angeles and State of California, have invented a new and useful Furnace, of which the following is a specification.

My invention is applicable to furnaces of various kinds, but is especially adapted for use in assayers' furnaces and the like requiring intense heats.

An object of my invention is to produce as complete combustion and as intense heats as may be practicable with the fuel burned in the furnace.

Another object of my invention in its use in assayers' furnaces is to provide a superior muffle-furnace. In carrying out my invention in this regard I provide a muffle-furnace having a muffle for melting the charges and having another muffle for cupeling.

A further object of my invention is to provide for a considerable extension of a flame of intense heat. The flame produced by the use of my invention becomes practically invisible when the furnace is in operation, with gasolene as a fuel applied through a suitable burner of the open Bunsen type.

My newly-invented furnace in its preferred form for assay-furnaces is shown in the accompanying drawings as being provided with a plurality of combustion-chambers which successively diminish in capacity and which are connected in succession by contracted passages which successively diminish in cross-sectional area. I have found that with a furnace constructed after the manner stated a flame can be produced in each of a succession of combustion-chambers after the temperatures of such chambers, respectively, have been brought to the igniting temperature of the gas supplied to them respectively. In actual practice the flame produced in each of the successive chambers is practically invisible, but of a very high temperature, and the flame produced in any chamber completely fills the same, so that the invention is especially adapted for heating muffles and large irregular surfaces, for the reason that the flame envelops the muffle or other surface to be heated, so that the muffle will heat on the top and sides to substantially as high a degree as on the bottom or on the side exposed to the initial fire.

In the application of the invention for heating muffles my invention comprises a furnace provided with a primary combustion-chamber, a secondary combustion-chamber of less capacity than the primary chamber, a passage communicating between the chambers, and an outlet-passage leading from the secondary combustion-chamber and being of less cross-sectional area than said connecting-passage, and a muffle the upper portion of which forms an inner surface of the secondary combustion-chamber. Preferably the muffle is made to partially obstruct the opening between the primary and secondary chambers, the unobstructed portion of said opening being of greater cross-sectional area than the outlet from said secondary chamber.

In actual practice the initial fire or flame directly from the burner can first be introduced into a combustion-chamber and thence passed through a contracted passage to a chamber beneath a muffle or other body to be heated and thence through a contracted passage into a chamber which surrounds the upper part of the muffle or other body to be heated, or the initial fire can be introduced into a chamber immediately below the muffle or other body to be heated and thence through a contracted passage into the chamber which surrounds the upper part of the muffle or other body. For convenience in the description I will term the chamber below a muffle or like obstruction the "primary" combustion-chamber and the chamber into which the products from said primary chamber are conducted for a subsequent combustion the "secondary" combustion-chamber. The primary combustion-chamber may in some instances be the initial combustion-chamber, while in other instances it may be the secondary, tertiary, or quaternary combustion-chamber, or a combustion-chamber still further removed from the initial chamber, and the several secondary chambers may be secondary, tertiary, quaternary, or still further removed from the initial combustion-chamber into which the initial fire is introduced.

In carrying out my invention it is preferable to return the walls of the secondary combustion-chamber inward to form the walls of the mouth of the outlet from such chamber, with cavities of the chamber on opposite sides, respectively, of said mouth.

My invention relates to means for producing combustion in thorough accordance with philosophical and scientific principles, which I will now set forth, to wit:

The purpose of this invention is to bring into actual contact a maximum percentage of the various combustible constituents of any fuel which will chemically unite to produce heat. It is my purpose to practically exhaust the heat-producing elements of any given fuel in any kind of furnace for any purpose for which high temperatures are practicable. The phenomenon known as "combustion" results from the contact of quantities of oxygen with quantities of carbon or hydrogen. These substances will only mix and make chemical union when furnished in quantities denoted as their chemical equivalents, the chemical equivalents being oxygen, eight; carbon, six; hydrogen, one. They will only chemically combine in these or multiples of these chemical equivalents—that is to say, the chemical equivalents of oxygen and carbon are as eight to six and those of oxygen and hydrogen are as eight to one. Combustion between oxygen and carbon is produced either by the single chemical equivalent eight of oxygen and six of carbon or the multiple of eight of oxygen, which may be sixteen, or other multiple, as twenty-four. In practical mixing of hydrocarbon gas and the oxygen of the atmosphere it is practically impossible to reduce the oxygen to its moleculous state and the carbon to the same and thoroughly incorporate the two substances so that one molecule of carbon shall be in perfect contact with two molecules of oxygen. Consequently in any present-known flame it seems that the mixing of the hydrocarbon gas and the oxygen occurs in larger quantities, and when the quantity of oxygen comes in contact with the quantity of carbon combustion takes place between the two quantities so far as their contact is produced; but the very product of the combustion, if it be in proper portions, produces a dioxid which encysts and separates the remaining part of the oxygen from the remaining part of the carbon—that is to say, each of the remaining quantities of oxygen and carbon is encysted in a non-combustible gas of dioxid. The fact that combustion of a part of the oxygen and carbon has taken place demonstrates an excessive expansion of volume. Consequently if the volume be in a partially-inclosed space, like a furnace or fire-box, the gases therein contained (being the product of the combustion) must produce a certain pressure within the space, holding the remaining particles of oxygen and carbon in suspension, but not in contact with each other. Now by passing this product through a contracted exit into a chamber which is larger laterally than the exit and of a capacity proportionate to that of the prior fire-box the expansion of these gases is allowed, and in that expansion a general change of locality of the dioxid and the unconsumed oxygen and carbon particles ensues. Now by a proper construction and arrangement of the chamber, its inlets and exits, in which this expansion is allowed, the unconsumed oxygen and carbon particles can be brought into contact with each other and an ignition and combustion produced. In order to produce this mixture, it is necessary that the chamber, with its entrance and exit, be so constructed as to maintain a required pressure upon the gases and also to produce within the chamber opposing currents for general mixing up of the gases. In the mixing and combustion chamber while the expanded gases are impinging upon the contents of such chamber, which are being partially held by the construction of the resisting walls of the chamber, a general breaking up of the columns of the gases must occur and another mixing of the gases takes place, and the required pressure is sustained, and these particles of unconsumed oxygen and carbon which come in contact will ignite, producing results corresponding to those produced in the first chamber. By repeating the same process of exit and expansion and remixing further combustion is produced.

From extensive experiments made it requires at least four mixing and combustion chambers to entirely exhaust the combustible materials of hydrocarbon gas and oxygen when introduced to a furnace by the latest and most approved methods. After the expansion, which results at the moment of combustion, the particles of the combustibles being surrounded by the dioxid product of the combustion, and thereby separated from each other, are incapable of further combustion until the encystment is broken up and the combustible particles are brought together in the appropriate proportions and at the required temperature. This breaking up of the product and reuniting the combustible elements is accomplished by passing the product through an exit of smaller dimensions than the first combustion-chamber and discharging it into another combustion-chamber of greater cross-sectional area than the exit and of a definite capacity.

It is essential in carrying out my invention that the interior of the furnace must be so constructed that vapor-mixing combustion-chambers are formed appropriately, as distinguished from any arrangement of flues in furnaces heretofore known, for carrying off the heat and the products of combustion. In order that successive combustions shall take place, the passages and chambers must be so constructed as to remix the gases or vapors.

It is not sufficient in carrying out my invention that a flue be simply provided with a greater or less number of enlargements and contractions. The walls of the enlargements or chambers and the inlets and outlets from such chambers must be constructed and arranged to successively produce a contraction, an expansion, and a backward deflection of the gases and vapors thus to remix the said vapors and gases in the successive enlargements or mixing and combustion chambers for breaking up and remixing in the respective chambers the columns of gases and vapors which enter said chambers, respectively, from their immediately preceding chambers, respectively.

By extensive experiments it was found that in an initial fire nothing like perfect combustion could be obtained. The product of the most perfect fire obtainable was found to readily ignite again, although the hydrogen was absent, the same being consumed in the initial fire. The temperature for the secondary ignition had to be much higher to incite chemical action between the oxygen and carbon than in the first instance; but in successive instances of ignition until one or the other of the combustibles was exhausted no increase or change in temperature was required in the various combustion-chambers. It was found that the only requisite to again ignite the combustibles remaining in the product of a previous fire was to suddenly relieve the pressure upon the same and then return the gases upon themselves by deflection, when the enveloping non-combustible gases would release the captive combustibles, (oxygen and carbon,) which then by their natural affinity would again come in contact and if at an ignition temperature combustion would instantly ensue to all that were in contact in proper proportions. To produce this result by mechanical construction continuously in the one furnace or firebox, was found quite impossible unless the character or quantity of the first or initial fire was taken into the account; but when this was a known quantity the relative dimensions of the first, second, third, and fourth combustion-chambers, with their several intakes and exits, could readily be estimated. It matters not what fuel is used if the initial fire is of sufficient quantity to raise to an ignition temperature the second chamber combustion there will instantly be the result, the same being true in the case of each subsequent chamber, so long as there remains any quantity of both oxygen and carbon.

My invention is not limited to the use of any stated number of chambers.

The accompanying drawings illustrate my invention in two of the forms in which I have applied it in assayers' furnaces heated by an open Bunsen burner.

Figure I is a perspective view of a combination melting and cupeling furnace. The cover for the crucible-chamber and the stopper for the muffle are omitted from the view. Fig. II is a plan of this furnace on a reduced scale. Dotted lines indicate the interior construction. Fig. III is a vertical section on line III III, Figs. II and IV. Fig. IV is a vertical section on line IV IV, Fig. III. Fig. V is a vertical section on line V V, Figs. VI, VII, and VIII, illustrating a combination muffle-furnace embodying my invention. Fig. VI is a vertical section on line VI VI, Figs. V, VII, and VIII. Fig. VII is a plan section on line VII VII, Figs. V and VI. Fig. VIII is a plan section on line VIII VIII, Figs. V and VI.

In Figs. I, II, III, and IV, $a$ indicates the body of a combination melting and muffle furnace. $b$ indicates the initial combustion-chamber, the same being the crucible-pot of this furnace. $c$ indicates a contracted outlet-passage leading from the initial combustion-chamber $b$. $d$ indicates a combustion-chamber the top of which is formed by the muffle $e$. $f$ indicates an outlet-passage leading from the combustion-chamber $d$ into a combustion-chamber $g$. With relation to the muffle $e$ the chamber $d$ is a primary combustion-chamber. The passage $f$ is of less cross-sectional area than the passage $c$, and the secondary combustion-chamber $g$ is of less capacity than the primary combustion-chamber $d$, and said primary combustion-chamber $d$ is of less capacity than the initial combustion-chamber $b$. $h$ indicates an outlet from the secondary combustion-chamber $g$. This outlet may open into another combustion-chamber, if desired. In the furnace shown in Fig. I $i$ indicates a flue leading from the outlet $h$. The passage $c$ leads from chamber $b$ into chamber $d$. In the practical construction of a furnace of this character the muffle $e$ is set in an opening between the combustion-chambers $d$ and $g$ and partially closes said opening, so that the unobstructed portion $f$ of the opening is of greater cross-sectional area than the outlet $h$ from the secondary combustion-chamber $g$. The tops of the walls of the secondary combustion-chamber $g$ are preferably returned inward toward the muffle to form the mouth of the outlet $h$, with cavities 1 2 on the opposite sides of said outlet, so that the combustion-chamber $g$ is contracted above the muffle at the outlet, as shown in Fig. III.

Referring to Figs. V, VI, VII, and VIII, $a'$ indicates the body of the furnace. $d'$ indicates a combined initial and primary combustion-chamber—that is to say, the combustion-chamber $d'$ receives the initial fire and also serves as the primary combustion-chamber with relation to the muffle $e'$. $g'$ indicates the secondary combustion-chamber for the muffle $e'$. $f'$ indicates the outlet-passage leading from the combustion-chamber $d'$ into the combustion-chamber $g'$. $h'$ indicates the outlet leading from the combustion-chamber $g'$ into a primary combustion-chamber $d''$ for a muffle $e''$, which forms the top of the combustion-chamber $d''$ in the same manner as the muffle $e'$ forms the top of the combustion-chamber $d'$. $f''$ indicates the outlet from the primary combustion-chamber $d''$ into the secondary combustion-chamber $g''$. $h''$ indicates the outlet from the secondary combustion-chamber $g''$. 1' 2' indicate the cavities on the opposite sides of the mouth of the outlet $h'$. 1'' 2'' indicate the cavities on the opposite sides of the mouth of the outlet $h''$. In the several views $j$ indicates supports for the inner ends of the muffle. $k$ indicates a burner for supplying the initial fire to the furnace.

In Figs. III and IV, $m$ indicates the cover for the crucible-pot. $n$ indicates a pipe connecting between the muffles and the flue to carry off the fumes.

In practical operation the initial fire is introduced into the initial fire-chamber, and the flame proceeding therefrom through the contracted outlet is first contracted and then is allowed to expand into the succeeding combustion-chamber. When the combustion-chamber into which the products of combustion are emitted has been heated to a sufficiently high temperature, the products which enter the chamber become ignited and produce a flame of great intensity. The products of this combustion are again contracted by the succeeding outlet and are again allowed to expand into a succeeding combustion-chamber, and when such succeeding combustion-chamber is heated to the igniting temperature for such products another ignition takes place and the resulting flame heats such succeeding combustion-chamber to a high temperature, and so on throughout the furnace.

By the arrangement shown in Figs. V, VI, VII, and VIII when the lower muffle $e'$ is heated to a temperature sufficient for melting the charges for assayer's work the muffle $e''$ will be heated to the heat proper for cupeling, and this is accomplished with no greater expenditure of fuel than would be required for heating the lower muffle independently of the upper muffle. In the form shown in Fig. I the muffle is readily heated from the products of the flame which is required for heating the crucible-pot $b$, and no more fuel will be required for heating both the muffle and the crucible-pot than would be required for heating the crucible-pot alone.

Different kinds of fires—that is to say, fires made in different ways or with different kinds of fuel—will require special sizes and numbers of chambers, intakes, and exits for each. The great advantages of this discovery are not only in creating a greater amount of heat by consuming so much larger per cent. of the fuel, but by extending the actual flame of combustion over a much greater absorbing and radiating surface, also solving the "smoke nuisance", as it is absolutely impossible for any smoke to pass the third chamber after that has attained an igniting temperature.

In taking assay-furnaces as illustrations for my invention it is not the intention to make any claim upon their previously-known construction or combinations. It is well known that none of the heretofore-known combination melting-pots and muffle-furnaces can be operated satisfactorily from one fire at one end of the same. It is also well known that with former muffle-furnaces no muffle has ever heretofore been heated to an equable temperature throughout—that is to say, to the same temperature at the top and bottom. The bottom next to the fire being much the hottest, the heat is transmitted through the cupel to the lead to raise the same to the proper degree of heat to oxidize. When the fumes rise to a cooler atmosphere in the upper part of the muffle, the oxid would precipitate and fall to its own or some other cupel, thereby causing imperfect cupeling. With my discovery applied to either the heretofore-known "combination melting-pot and muffle-furnace" or to the single or double furnace it makes each of those inventions highly useful in obviating the above difficulties. With this invention the product of the fire required for melting is passed from the melting-chamber into a combustion-chamber beneath the muffle, where it ignites. Its resultant product is passed to the next combustion-chamber above and around the sides and top of the muffle and is there ignited and produces a degree of heat so nearly the same as that produced below the muffle that no difference in temperature can be detected in the top, bottom, or sides of the muffle by calorimeter or by the fusion-point of metals. The capacity of the combustion-chambers, their intakes, and exits can be so nicely adjusted to the initial fire used that when the melting-pot is maintained at a melting heat the muffle is and must be exactly at the temperature required for cupeling. The various forms of the combustion-chambers adopted in the drawings are only to accommodate them to the external, internal, and structural forms and requirements of the previously-used assay-furnaces. The gas-mixing combustion-chambers can be made in any form to suit the requirements of any case if they at all times provide for proper amount of expansion sidewise or upward, or both, and for the required deflection to return the gases or vapors upon themselves in the chamber and just proportions are maintained. These combustion-chambers must not be confounded with flues, smoke or heat passages, cavities made by bridge-walls, &c. The reason is plain. It matters not how many times you may bend a bundle of cords each cord will remain relatively parallel to its neighbors. So, also, will the columns of various gases and solids as they are forced away from the flame, where they have been created by the innumerable explosions produced by the chemical action of the combustibles upon each other and which action is ordinarily termed "combustion," into and through the various forms of flues. In contradistinction to such operation my combustion-chambers permit the instant expansion of these columns, also impinging them upon the contents of the chamber, (which is checked by the proper outlet at a proper distance from the intake,) and by these means the columns and encystments are entirely broken, the pressure relieved, and the combustibles allowed to come in contact with each other.

It is to be noted that the succeeding combustion-chambers are connected by contracted passage-ways and are respectively broadly expanded and are closed to atmospheric air between inlet and outlet, whereby the gases emitted from a preceding chamber are first compressed in the passage-way and then allowed to suddenly expand into a succeeding chamber and then again compressed, thereby producing in succession the conditions necessary for igniting the gases with substantially an explosive effect in the succeeding chambers, respectively, elements which were not brought to ignition in the preceding chamber or chambers. It is also to be noted that where a series of superposed muffles are used, as shown in Figs. V and VI, the muffles are respectively surrounded with the primary and secondary combustion-chambers pertaining to such muffle and that the primary and secondary combustion-chambers pertaining to any muffle are connected by a contracted passage and that the secondary combustion-chamber of a preceding muffle is connected with a primary combustion-chamber of the succeeding muffle, whereby the impingements of the constituents of the gases emitted from the secondary combustion-chamber are upon the succeeding muffle and each muffle is surrounded by fire resulting from a primary and a secondary combustion, so that the entire muffle is surrounded by elements in active combustion. This intermixture and combustion resulting from two currents being directed in substantially opposite directions occurs just before the mixture is introduced into the next combustion-chamber. In speaking of the two opposing currents it should be understood that I refer to one fork of the flame which is turned, bent, or deflected back upon itself, although there is considerable intermixing when the two branches on opposite sides of the muffler come together just before they enter the contracted portion before they pass to the next chamber.

What I claim, and desire to secure by Letters Patent of the United States, is—

1. In a furnace such as described, a plurality of gas-mixing combustion-chambers, each successive chamber connected with its predecessor by a contracted channel the initial end of which is in advance of and at an acute angle with the terminal portion of the wall of the chamber, and each chamber gradually increasing in area from the outlet-passage of its predecessor and then gradually decreasing in area toward its own outlet-passage to the succeeding chamber; whereby the gaseous products contained in each chamber and moving successively in the general path of the draft of the furnace, are caused to reverberate against the draft-current to release encysted constituents and mix the same in due proportions to be ignited by the heat generated by previous ignitions or explosions.

2. A furnace furnished with a primary combustion-chamber, a contracted outlet leading therefrom, a secondary combustion-chamber forming an abrupt expansion of said outlet, a contracted outlet from said secondary combustion-chamber at the top of the same, a tertiary combustion-chamber forming an abrupt expansion of said outlet from the secondary combustion-chamber, and a contracted outlet leading from said tertiary combustion-chamber the walls of said tertiary combustion-chamber being returned inward toward the said outlet therefrom.

In testimony whereof I have signed my name to this specification, in the presence of two subscribing witnesses, at Los Angeles, California, this 30th day of December, 1899.

HENRY BOUNDS CARY.

Witnesses:
JAMES R. TOWNSEND,
FRANCIS M. TOWNSEND.